April 9, 1968 V. A. JOHNSON ET AL 3,376,860
MECHANICAL LASH ADJUSTER
Filed Jan. 11, 1966 3 Sheets-Sheet 3

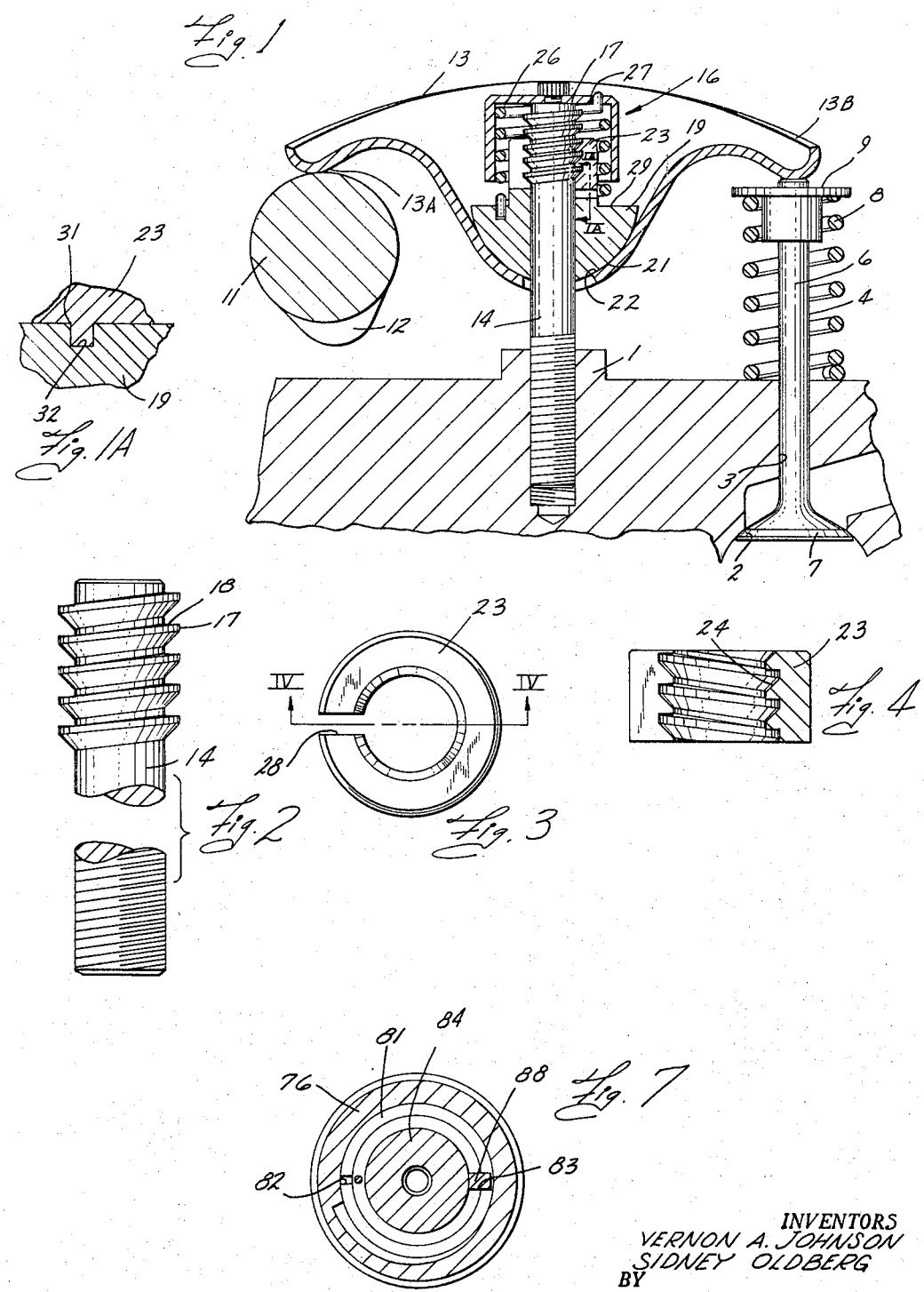

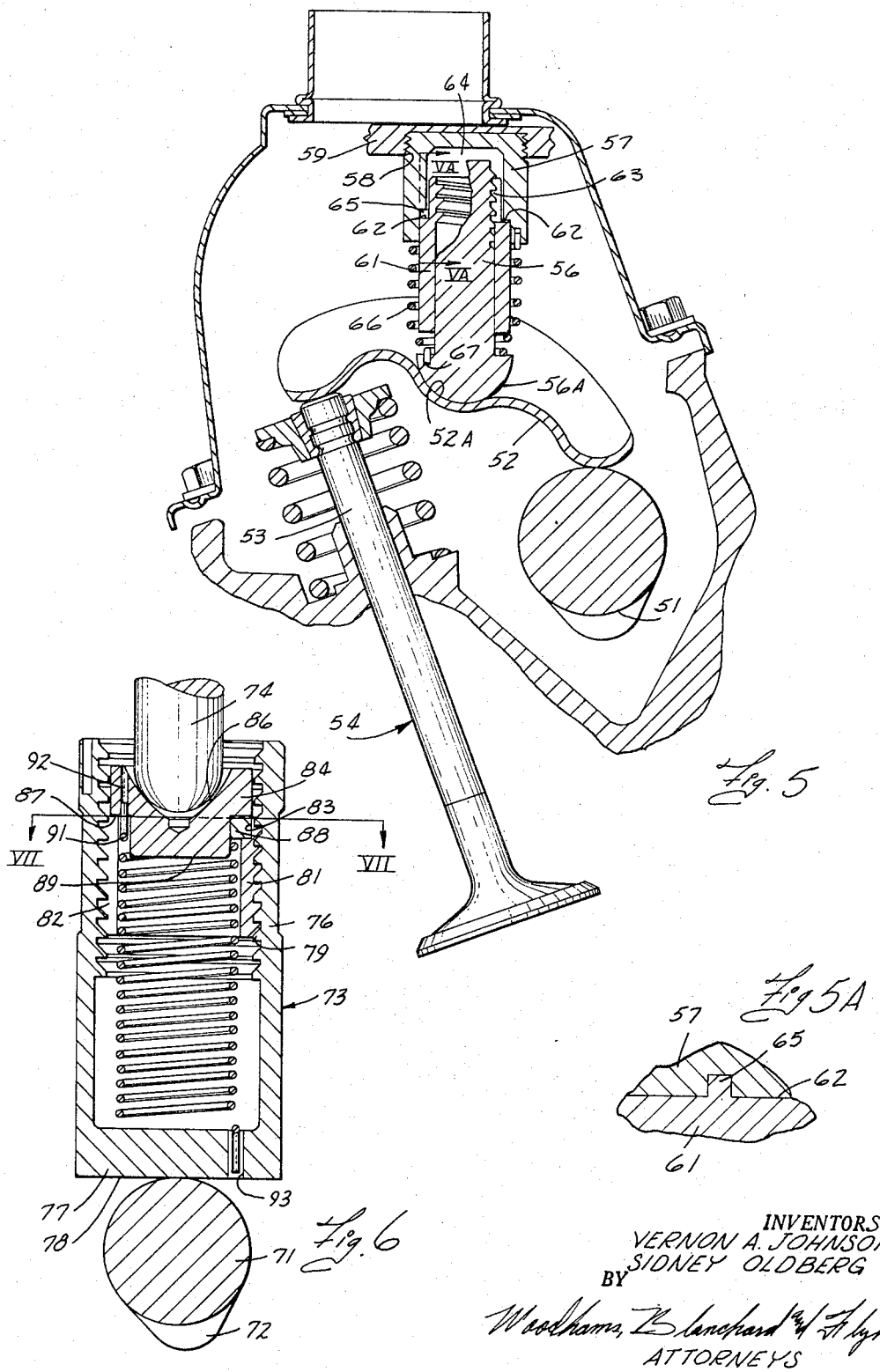

INVENTORS
VERNON A. JOHNSON
SIDNEY OLDBERG
BY
Woodhams, Blanchard & Flynn
ATTORNEYS

United States Patent Office 3,376,860
Patented Apr. 9, 1968

3,376,860
MECHANICAL LASH ADJUSTER
Vernon A. Johnson, Southfield, and Sidney Oldberg, Birmingham, Mich., assignors to Eaton Yale & Towne Inc., a corporation of Ohio
Filed Jan. 11, 1966, Ser. No. 519,865
22 Claims. (Cl. 123—90)

ABSTRACT OF THE DISCLOSURE

A mechanical lash adjuster for use in a force transmitting train having first and second overlapping members which define a linkage having a longitudinal axis and a releasable lock interconnection therebetween. When a longitudinal force is applied to the linkage the locked interconnection becomes released and causes a movement of one member with respect to the other member and a limited change of length of the linkage in the longitudinal direction. Reaction means are provided for yieldably opposing the movement and tending to effect the return of the members to their original position when the longitudinal force is removed therefrom.

This invention relates to automatic clearance adjusting mechanism in a mechanical force transmitting train, and particularly to such clearance adjusting mechanism applicable for use in connection with mechanical valve operating means for an internal combustion engine.

Inasmuch as the invention has been developed primarily for application to the valve operating mechanism for an internal combustion engine, same will be described in the environment of such use. However, it will be recognized that the mechanical principles involved will be applicable to other uses such as in a self-compensating ball joint suspension system for automobiles and accordingly the employment of the specific environment above referred to will be recognized as illustrative only and not limiting.

Referring now to the provision of mechanical valve operating means for an internal combustion engine, it is well recognized that the clearances between the parts comprising the mechanical train driving said valves should be as close to zero as possible but, for obvious reasons, it cannot be permitted to become negative. Further, as is well understood, the clearances which are effective and satisfactory when the engine is cold are not satisfactory when the engine is hot. It is therefore desirable, and has been the subject of considerable prior investigation in connection with mechanical valve lifters, to provide self-adjusting means within the mechanical train operating a valve of the type aforesaid which will under all circumstances of operation tend to adjust the tappet clearance toward zero but will not carry such adjustments past zero. A number of mechanical valve lifters have previously been offered to the market and intended to deal with this problem, but as far as we are aware, they are either undesirably complex and thereby expensive, they are subject to breakdowns or they are insufficiently accurate to be acceptable.

Accordingly, the objects of the invention include:

(1) To provide a mechanical self-adjusting device by which a clearance in a mechanical force transmitting train is brought toward zero but does not tend to become negative.

(2) To provide a device, as aforesaid, which will work with sufficient effectiveness that said clearance will be brought toward zero with a high degree of accuracy.

(3) To provide a device, as aforesaid, which will operate with sufficient rapidity as to maintain said clearance substantially at zero under all conditions of operation in such service as the valve of an internal combustion engine.

(4) To provide a device, as aforesaid, which will be composed of sufficient rugged components as to have a high degree of reliability under all conditions of normal operation.

(5) To provide a device, as aforesaid, which will be of sufficient simplicity as to have a high degree of reliability in operation.

(6) To provide a device, as aforesaid, whose principles will be applicable to a wide variety of specific applications. and will be particularly applicable to a number of different valve train mechanisms as same are utilized in different internal combustion engines.

Other objects and purposes of the invention will be apparent to persons acquainted with apparatus of the general type upon reading the following specification and inspecting the accompanying drawings.

In the drawings:

FIGURE 1 is a side elevational, centrally sectioned, view of a valve and valve operating mechanism embodying the invention as applied to use in and with an internal combustion engine.

FIGURE 1A is a section taken on the line IA—IA of FIGURE 1.

FIGURE 2 is a side elevational view of the post means on which the valve operating rocker arm is mounted.

FIGURE 3 is a top view of the self-adjusting nut provided for cooperation with said post.

FIGURE 4 is a section taken on the line IV—IV of FIGURE 3.

FIGURE 5 is a view generally similar to FIGURE 1 showing a modification wherein the principles of the invention are applied to a different type of valve operating mechanism.

FIGURE 5A is a section taken on the line VA—VA of FIGURE 5.

FIGURE 6 is a view generally similar to FIGURE 1 and showing a still further modification.

FIGURE 7 is a section taken on the line VII—VII of FIGURE 6.

Figure 8:
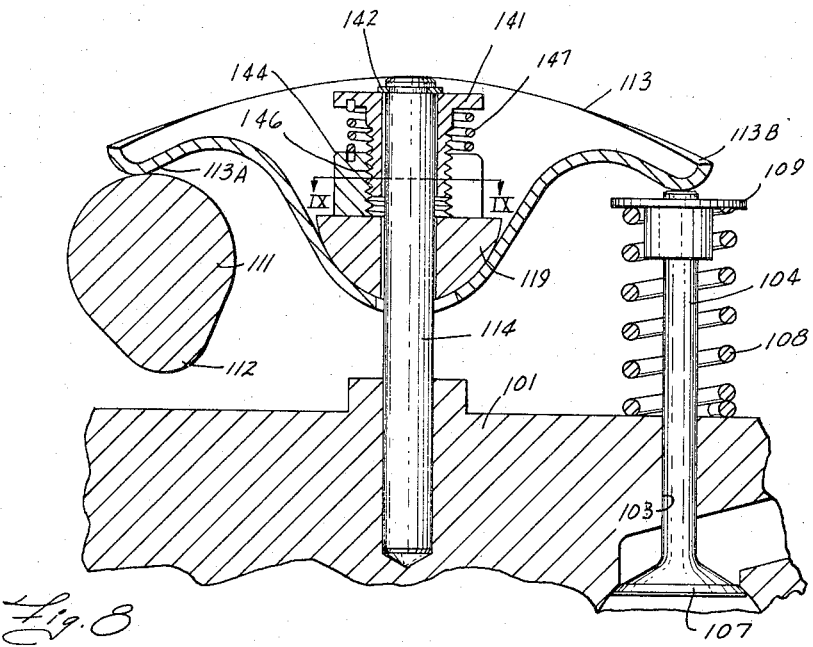
FIGURE 8 is a central section of a further structural modification corresponding functionally to FIGURE 1 but arranged for easier installation into operating position.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will

General description

Briefly, the invention consists of providing at some point in the mechanical linkage between the power source and the load, wherein a lineal thrust is created, a nut and screw arrangement so connected into said train that adjustment of the nut on the screw will modify any clearances existing in said train. One of said nut and screw is arranged to permit radial movement of its walls in response to an axial load thereon, the threads interconnecting said nut and screw being such that said radial movement will break static friction therebetween and allow the axial load thereon to effect a unidirectional relative rotation therebetween. Such relative rotation is opposed by suitable resilient means with the result that application of load to the linkage train will tend to urge relative rotation between said nut and screw in one direction and release of such load will permit the resilient means to effect relative movement between said parts in the opposite direction.

Detailed description

Referring now to the figures in detail, and particularly to the FIGURES 1–4, there is shown for illustrative purposes the cylinder head 1 of a conventional internal combustion engine provided with a valve seat 2 and a valve guide 3. A valve 4 is positioned within said valve guide in a conventional manner such that its stem 6 will be suitably guided by the valve guide 3 and its head 7 will seat properly on the valve seat 2. The valve is provided with the usual valve spring 8 and spring cap 9 arranged in the usual manner for holding said valve 4 normally closed. A conventional cam shaft 11 is provided with the usual cam lobes of which one appears at 12. A conventional rocker arm 13 is operatively provided between the cam lobe 12 and the upper end of the valve stem 6, said rocker arm being pivotally supported on the post 14 by a resistance means 16 in such a manner that upward movement of the cam lobe 12 will cause same to bear against contact surface 13A of the rocker arm and effect a pivoting of the rocker arm 13 around the resistance means 16 in a known manner to cause its rightward end 13B to bear against the upper end of the valve stem 6 for opening of the valve. Removal of the cam lobe 12 from the contact surface 13A of the rocker arm 13 then permits the valve spring 8 to bear against the spring cap 9 for returning the valve upwardly and closing same in a conventional manner. It will be apparent that the clearances between the cam lobe 12 and the rocker arm surface 13A on the one hand, and the clearance between the valve stem 6 and the rightward end 13B of the rocker arm 13, on the other hand, will both be determined by the vertical position of the rocker arm 13 with respect to the post 14 and this is in turn determined by the adjustment of the resistance means 16. Thus, resistance means 16 and the means for the automatic adjustment thereof constitutes the invention herein under consideration.

Turning now to the resistance means 16 in detail, there is provided at the upper end of the post 14 a thread 17. The thread 17 is preferably, though not necessarily, provided with a relatively low helix angle, such as less than about 4°. Examining said thread more closely, it will be apparent that in this embodiment the upper side of said thread is provided throughout with a relatively flat surface 18, the same being in a radial direction with respect to said post substantially perpendicular to the axis of said post. More precisely, for purposes of convenience in manufacture and to insure minimum interference therebetween, the surface 18 is normally inclined in a radial direction at an angle between 0° and 7° inclusive to the radial plane of the post. It should be emphasized, however, that the angles so mentioned are illustrative only and may be varied widely within the scope of the invention and without appreciably interfering with the effectiveness of its operation. The lower sides of said thread are in the illustrated embodiment comprised of elements making with the axis of the post 14 an acute angle which, in the present embodiment, is shown as being at about 45°. Said angle may somewhat less than 45° if desired, but for best operation should not be appreciably greater. Such a thread is often termed a "buttress" thread. In other embodiments, other types of threads may be used, such as conventional S.A.E. type threads.

Sleeved over said post 14 is a pressure member 19, the same having a generally rounded lower surface 21 for bearing against the similarly rounded surface 22 of the rocker arm. Said surfaces 21 and 22 are contoured in a known manner to permit the rocker arm to slide smoothly with respect to the pressure member 19 and, in effect, permit said rocker arm to pivot about a line constituting the common axis around which said surfaces 21 and 22 are generated.

A nut 23 has internal threading 24 similar to the buttress threading 17 and is screwed onto the threading 17 of the post 14 to determine the axial position of the pressure member 19 with respect thereto. The nut is split at 28. The slanted sides of the threads on both the post 14 and the nut 23 are so oriented that the appearance of a normal operating thrust in the linkage will tend to slide one set of buttress threads up the ramp provided by the other set to increase the radial pressure therebetween.

A resilient torsion member, here a coil spring 26, is mounted against a cap structure 27 which in turn is mounted onto the post 14 and held against rotation in any convenient and presently known manner. Said spring 26 is further affixed to such cap structure 27 in a manner to prevent relative rotation with respect thereto. The lower end of said spring is received into the pressure member 19 in such a manner as to prevent relative rotation between said spring and said pressure member. The upper end of the pressure member 19 is in this embodiment interengaged with the nut 23 in a convenient manner to prevent relative rotation therebetween, such as by tongue and groove means 31 and 32.

Thus, rotation of said nut 23 downwardly with respect to the post 14 will diminish the clearance or lash in the valve operating train whereas rotation of said nut upwardly with respect to said post 14 will increase such lash.

Alternatively, the lower end of the spring may be fastened to the nut 23, in which case the tongue and groove means 31 may be omitted and the nut permitted to rotate with respect to the pressure member. Also, the nut will urge the pressure unit against the rocker arm 13. A further possibility is to make the nut 23 and pressure unit integral in which case the spring may be anchored either to the nut portion or as shown in FIGURE 1.

Operation

Assuming the parts to be in a position of zero lash, and the cam shaft 11 rotating, the lobe 12 will bear against the surface 13A of the rocker arm 13 to urge same upwardly. This, in effect, urges the pressure member 19 against the nut 23. This tends to urge the nut 23 upwardly with respect to the screw 14 whereupon the slope of the lower sides of the threads 17 acting against the corresponding slope of the threads 24 tends to spread said nut radially outwardly.

This effectively breaks the static friction between the two contacting surfaces and once the static friction is broken in one plane, it is in effect broken in all planes. This permits the threaded members to screw together with respect to each other slightly down the helix angle (it being noted that "down" the helix angle is upwardly in FIGURE 1). When the load is removed, the split member springs back to normal, again breaking static friction if any has developed and the torsion member winds the threaded members back toward a position of zero lash.

Thus, as the nut 23 spreads, it tends to rotate slightly down (upwardly in the drawing) the ramp provided by the angled surfaces of the threads between the two members whereby to provide a slight loss of lift in the valve operating structure. This is only slight, however, so that in effect the pressure member 19 constitutes a pivot point and the rightward end 13B of the rocker arm 13 bears against the valve stem 6 to open the valve in the usual manner. When the valve closes, it may close in any of three conditions, namely, such that there is a looseness between the rocker arm 13 and the valve stem 6 (positive clearance or lash), such that there is contact between said rocker arm and the valve stem but no appreciable pressure therebetween (zero clearance), or such that there is sufficient pressure between the end 13B of the rocker arm and the valve stem that said valve does not quite fully close (negative clearance). If the first-named condition exists, the looseness of the parts permits the spring 26 to screw the nut 23 downwardly on the threads 17 until such looseness is eliminated, namely, until the pressure member 19 urges the rocker arm sufficiently that its end 13B will contact the upper end of the valve stem 6. Thus, any positive lash will be immediately eliminated. If the second of the conditions above named exists, there will be sufficient tightness in the parts so that the torsion of said spring will not be sufficient to effect a rotation of the nut 23 with respect to the post 14 and the parts will remain in such condition which is the condition desired. If the third condition above described exists, the nut 23 will again be held by the tightness of the parts against rotation. In this third condition, however, subsequent cycles of operation will continue to effect rotation of the nut 23 in a lift losing direction with respect to the post 14 so that the negative clearance will be quickly eliminated.

The normal operation is for there to be a slight rotation of the nut 23 down the threads 17 (upwardly in FIGURE 1) and a consequent slight loss of lift with each actuation of the rocker arm 13 by the cam lobe 12, thus tending to create a slight positive clearance, which insures full closing of the valve, followed by return of the parts as above described to a condition of zero clearance immediately upon closure of the valve. Thus, repeated cycles as aforesaid will insure that the mechanism will very quickly adjust itself to any given operating condition of an engine and maintain itself in a condition of substantially zero lash, both while the engine is running cold, and after the engine becomes heated.

Modifications

Turning now to FIGURE 5, there is shown a cam structure 51 acting against a rocker arm 52 for operating the stem 53 of a valve structure 54. A post 56 has a rounded lower end 56A for bearing against a similarly rounded surface 52A in the rocker arm 52 for pivoting the rocker arm in a manner similar to that above described in connection with the rocker arm shown in FIGURE 1. A base structure 57 is provided and mounted rigidly with respect to the frame of the engine in any convenient manner, which may include screwing same by the threads 58 into a portion 59 of the engine frame. A sleeve 61 is provided having a split portion indicated at 63, and, if not made integral with the base 57, is provided with a shoulder 62 including a key 65 (FIGURE 5A) causing it to bear solidly against, and non-rotatably with respect to, a corresponding shoulder in the base structure 57. The post 56 and sleeve 61 are connected by threading at 64 which threading is similar to that above indicated at 17 and 24 in connection with FIGURE 1 and is so arranged and oriented that upward motion of the post 56 with respect to the sleeve 61 will tend to spread the split portion 63 and effect a screwing (upward in FIGURE 5) movement of the post 56 with respect to the sleeve 61.

A spring 66 encircles the sleeve 61 and is effective between the post 56 and the sleeve 61. Thus, the spring may be anchored at one end 67 in the post 56 and at its other end either to the base 57 (where as in the illustrated form the sleeve and base are connected) or directly to the sleeve 61.

Thus, as in the structure above described, each operation of the valve operating cam 51 will tend to effect a slight upward, screwing, movement of the post 56 with respect to the sleeve 61 and thereby a slight loss in lift between the rocker arm 52 and the valve stem 53, followed as soon as the pressure therebetween is relieved by a rotation of the post 56 with respect to the sleeve 61 in response to the torsion of the spring 66 to return the rocker arm 52 toward a condition of zero lash with respect to the valve stem 53.

FIGURE 5 shows a construction wherein the internal member is the split unit and the construction embodying the principles of the invention is a tappet device 73. In this figure there is shown a conventional cam shaft 71 carrying a cam lobe 72 bearing against the tappet 73 which in turn operates to move a valve operating rod, which may in some cases be the valve stem but is here a valve push rod 74. The valve rod is connected in a conventional valve train, not shown, provided with a conventional return spring, not shown, for urging said rod constantly downwardly as appearing in FIGURE 6. The lash adjustment between the cam lobe 72 and the valve rod 74 is brought about by lengthening or shortening of the tappet 73.

The tappet 73 is constructed by providing a generally cylindrical casing 76 having a closed end 77 whose bottom surfaces 78 is polished and hardened in a conventional manner for receiving contact from the cam lobe 72. Said casing 76 is internally threaded preferably by buttress threads 79 whose slanted sides face the direction of thrust, in this case upwardly. The internal member 81 is likewise buttress threaded for cooperation with the threads 79 and is provided with a split portion 82. A cutout 83 is also provided in said threaded member 81 for purposes appearing hereinafter.

A pressure member 84 is provided to slide within the casing 76 and has a recess 86 for reception of the rounded end of the valve rod 74. A shoulder 87 thereon limits the distance the pressure member 84 can move toward the threaded internal member 81. A key 88 is received into the cutout 83 in the member 81 and a mating recess within the member 84 for preventing relative rotation therebetween. A resilient member, here a helical spring 91, has one end anchored suitably to the pressure member 84, such as by being received into the opening 92 therein (or directly to the member 81 if preferred), is wrapped around the projection 89 and bears against the lower end 77 of the casing 76 with its corresponding end received into the opening 92 to anchor said end to said casing.

Alternatively, the threaded member 81 and the pressure member 84 may be made integral if desired.

The operation of this form of the apparatus is similar to that above described but will be reviewed briefly to insure complete understanding thereof.

As the cam lobe 72 applies pressure to the tappet 73, and against the resistance applied by the valve rod 74 through the pressure member 84 to the threaded member 81, the casing 76 tends to move axially with respect to the threaded member 81. This tends to compress the threaded member 81 by moving its walls radially inwardly, which movement is permitted by the split 82 therein. This, in the same manner as above described, breaks the static friction between the contacting faces of the interengaged threads and permits the parts to screw together slightly down the helix angle (downwardly in FIGURE 6) of said threads. Thus, the train between the cam lobe 72 and the valve rod 74 is slightly shortened and a slight positive clearance is introduced thereinto, but not sufficient to impair the opening of the valve, not shown. As the cam lobe 72 releases the tappet 73, such clearance removes the pressure between the interengaged threads, the resilient member returns to the relaxed position, and the torsion spring 91 rotates the two threaded members with respect to each other sufficiently to return such clearance to zero and the cycle is ready to repeat.

Figure 9:
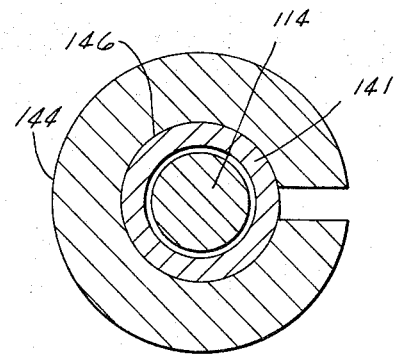
FIGURE 9 is a section taken along line IX—IX of FIGURE 8.

FIGURES 8 and 9 show a still further modification which functionally is similar to the form of FIGURES 1–4 but is arranged for easier installation. The parts corresponding to FIGURE 1 are illustrated by the same reference numerals with one hundred added thereto (thus part 11 in FIGURE 1 is part 111 in FIGURES 8 and 9) and the description thereof does not need to be repeated. It is noted, however, that instead of the threads shown on the post 14 in FIGURE 1 here the post 114 is pressed into place. A threaded sleeve 141 telescopes over the post 114 and is retained in place in any convenient manner by suitable retaining means 142 which may be a pin, a cotter key or a snap ring as desired. Said sleeve 141 is threadedly engaged with a radially split nut 144 by threads 146 having suitable slanted contact faces, the same being, for example, buttress threads as shown in FIGURE 1 or S.A.E. threads as shown in FIGURE 8. A torsion spring 147 extends between the sleeve 141 and the split nut 144.

The installation of the lash adjuster in particularly easy in this embodiment, the same requiring merely screwing the parts 141 and 144 together sufficiently to enable them to go onto the post 114 and under the retaining means 142, placement of same in such position and installing of the retaining means 142. The lash adjuster may then be released and same will automatically assume the correct position.

The operation is similar to the other forms above described wherein (a) the presence of a negative clearance at the upper end of the valve rod 104 will spread the split nut 144 and effect with each operation a slight further penetration of the sleeve 141 into the split nut 144, while (b) the existence of a positive clearance at the upper end of said valve rod will permit the sleeve 141 under the influence of the spring 147 to back up to the limit permitted by the retaining means 142. Thus, said lash adjuster will be self-compensating in the same manner for the same purposes as in the forms of the invention above described.

It will be noted that throughout the foregoing discussion it has been assumed that buttress threads as shown will be utilized, and such is preferable for the best operation of apparatus embodying the invention. However, any conventional threading having slanted side surfaces may also be utilized, one particular form being standard S.A.E. threads wherein the sides are equally slanted at 60° with respect to the axis of the parts. The buttress thread is preferred inasmuch as the area of the contacting surfaces for a given diameter is increased thereby diminishing the wearing thereof. Also, the angle effecting the radial movement of the split member is lower, thereby improving the ease and accuracy of the desired radial movement.

All of the foregoing examples dealt with linkage systems transmitting compressive forces. By reversing the direction in which the slanted faces of the threads are oriented and the direction of spring torque, the apparatus may be modified to remove clearance or lash, from a linkage system transmitting tensile forces.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. An automatic clearance adjusting device for use in a force transmitting train, comprising the combination:

first and second overlapping members which define a linkage having a longitudinal axis and a releasable locked interconnection therebetween, one of said members including means to permit release of said locked interconnection upon the application of a longitudinal force thereto and consequent movement of one member with respect to the other member and a limited change of length of said linkage in the longitudinal direction;

reaction means for yieldably opposing said movement and tending to effect the return of the members to the original position when the force is removed;

whereby said linkage will be unlocked upon the application of said longitudinal force thereto and undergo a slight change of length and will be urged to return to the original length thereof upon the removal of said longitudinal force therefrom.

2. The device of claim 1 wherein said first and second members are telescoped with respect to each other, one of said members being arranged for permitting movement of at least some of its walls transversely with respect to the direction of telescoping; and wherein said transverse movement also requires limited radial yielding of at least one of said telescoping members in response to said forces.

3. The device defined in claim 2 wherein said telescoping members are both cylindrical and one thereof is split to render at least some of the walls thereof movable transversely to the longitudinal axis thereof while resiliently opposing such movement.

4. The device defined in claim 2 wherein said members are interengaged by threads whose mutually contacting faces comprise elements arranged at an acute angle with respect to the direction of overlapping.

5. The device defined in claim 2 wherein said members are generally cylindrical in shape and one thereof is split for permitting transverse movement of at least a portion of its walls with respect to the common axis of said members and wherein said members are threadedly interengaged by threads whose faces, which are urged against each other upon application of said forces, comprise elements formed at an acute angle with respect to said common axis.

6. The device defined in claim 5, wherein the faces of said threads which contact each other upon the application of said forces are at approximately 45° with respect to the common axis of said telescoped parts and the other faces of said threads are approximately perpendicular thereto.

7. The device defined in claim 5 wherein both the faces of said threads which contact each other upon the application of said forces and the other faces of said threads are slanted with respect to the common axis of said telescoped parts.

8. The device defined in claim 5 wherein both the faces of said threads which contact each other upon the application of said forces and the other faces of said threads are approximately equally slanted with respect to the common axis of said telescoped parts.

9. An automatic lash adjuster for use with the valve operating system of an internal combustion engine, the combination comprising:

first and second overlapping members having a common longitudinal axis so arranged with respect to the valve operating means of the engine as to be urged together along said longitudinal axis in a first direction upon the application of a force within said system for opening said valves, one of said members being split to permit transverse movement thereof with respect to the common axis of said members;

interengaging thread means on each of said members providing a releasable locked interconnection therebetween, said split permitting release of said locked interconnection upon the application of a longitudinal force thereto, said thread means arranged for urging said longitudinal walls of said one member transversely with respect to the common axis on application of said force, whereby said members may move slightly down the helix angle of said thread means upon application of said force thereto and thereby effect relative rotation between said members in a one rotational direction to decrease the length of said first and second members; and resilient means constantly urging rotation of said one member with respect to said other member in the opposite rotational direction.

10. A device as defined in claim 9 wherein said split member is the external one of said telescoped members.

11. An automatic lash adjuster for use with the valve operating system of an internal combustion engine, the combination comprising:

first and second overlapping members having a common longitudinal axis so arranged with respect to the valve operating means of the engine as to be urged together along said longitudinal axis in a first direction upon the application of a force within said system for opening said valves, the internal one of said overlapped members being split to permit transverse movement thereof with respect to the common axis of said members;

interengaging thread means on each of said members arranged for urging said longitudinal walls of said one member transversely with respect to the common axis on application of said force, whereby said members may move slightly down the helix angle of said thread means upon application of said force thereto and thereby effect relative rotation between said members in a one rotational direction to decrease the length of said first and second overlapping members; and resilient means constantly urging rotation of said one member with respect to said other member in the opposite rotational direction.

12. In a valve operating system for an internal combustion engine, including a rocker arm, means pivotally supporting said rocker arm in an operating position, with respect to the engine head comprising the combination:

a post arranged for mounting nonmovably with respect to the engine head and extending away therefrom;

means including a resilient threaded element encircling said post and having an at least indirect bearing relationship with one of said post and said rocker arm in one direction along said post;

means including a substantially nonresilient threaded element having an at least indirect bearing relationship with the other of said post and said rocker arm in the other direction along said post and threadedly interengaged with said resilient element, the threading thereof providing interengaging faces between said elements which faces are sloped with respect to the axis of said post whereby upon application of a force between said post and said rocker arm and directed axially of said post, said internal thread faces of said nut moves slightly down the helix angle of said threading and thereby effect relative rotation between said threaded elements in one direction as to relieve said force; and resilient means constantly urging relative rotation of said threaded elements in the opposite direction.

13. The device defined in claim 12 wherein said nonresilient threaded element and said post are coaxially aligned with respect to each other.

14. The device defined in claim 12 wherein said nonresilient threaded member and said post are coaxially aligned and integral with respect to each other.

15. The device defined in claim 12 wherein said nonresilient threaded element comprises a sleeve member sleeved over said post and held thereby against movement away from said rocker arm and said resilient threaded element bears at least indirectly against said rocker arm.

16. The device defined in claim 15 wherein said resilient threaded element is external of said sleeve member.

17. The device defined in claim 12 including a pressure member interposed between said rocker arm and the one of said threaded elements most closely adjacent thereto.

18. In an automotive tappet of self-adjusting length, the combination comprising:

a generally cylindrical casing including means thereon for receiving valve operating force applied thereto;

a nut threadedly received within said casing, said nut being annular and split for permitting a resiliently opposed inward movement of a portion of its walls, at least portions of the interengaging faces of the threads between said nut and said casing being sufficiently slanted with respect to the axis of said nut and casing, and slanted in the direction of relative movement between said nut and casing when valve operating force is applied thereto, to effect said inward movement;

whereby said nut may move slightly down the helix angle of said thread means upon application of said force thereto and thereby effect relative rotation between said nut and casing in a direction to relieve said force;

a pressure member arranged for transmitting pressure from said nut to the valve operating means; and means constantly urging relative rotational movement between said nut and said casing in a direction oppostie the last-named direction.

19. In a valve operating system for an internal combustion engine including a rocker arm, means pivotally supporting said rocker arm in an operating position with respect to the head of said engine, comprising the combination:

a generally cup-shaped base structure fixed with respect to the head of the engine and opening toward said rocker arm;

a hollow sleeve member having one end received in said base structure and extending outwardly therefrom towards said rocker arm, the end of said sleeve member adjacent said base structure being provided with internal threads, at least the faces of said threads facing toward said rocker arm being sloped with respect to the axis of said sleeve member;

means limiting the extent to which said sleeve can move axially into said base structure;

a post member snugly received within said sleeve and threadedly engaging said threaded end of said sleeve, said post extending from said sleeve towards said rocker arm and having a rounded head for pivotally engaging and supporting said rocker arm one of said sleeve member and said post member being split to permit radial movement of the threaded portion thereof, whereby a pressure exerted on said post by said rocker arm towards said base structure will increase the force between said sloped faces of said threads on said sleeve and said post and the split member being capable of limited change in diameter in response to such pressure for breaking friction in a radial plane between said threads and allowing said post member to thread to a limited extent into said sleeve member in response to such pressure by said rocker arm;

a torsion element disposed effectively between said sleeve member and said post member arranged for rotatably urging said post member with respect to said base structure in a direction to cause said post member to be threaded along said sleeve member towards said rocker arm when the pressure exerted thereon by said rocker arm is reduced.

20. The device of claim 19 wherein the split member is the sleeve member.

21. The device of claim 19 wherein the split member is the post member.

22. In a mechanical lash adjuster for use in a linkage, a rocker having an opening extending therethrough in the thrust direction, a bearing support extending through said opening, bearing means slideable on said support and journaling the thrust side of the rocker adjacent said opening, a split nut on the support oppositely of the bearing means from the rocker, said split nut and support being interthreaded with locking threads, and resilient means reacting operatively between the support and split nut in opposing movement of the split nut in the direction of the rocker thrust, said split permitting an unlocking of said threads upon the application of a longitudinal force thereto, whereby said linkage will undergo a slight change of length and will be urged to return to the original length thereof upon the removal of said longitudinal force therefrom by said resilient means.

References Cited

UNITED STATES PATENTS

| | | | |
|---|---|---|---|
| 1,790,998 | 2/1931 | Perkins | 123—90 |
| 2,050,766 | 8/1936 | Russell | 123—90 |
| 2,308,858 | 1/1943 | Burkhardt | 123—90 |
| 2,934,051 | 4/1960 | Drew | 193—90 |
| 2,962,011 | 11/1960 | Rosenberger | 123—90 |
| 3,146,766 | 9/1964 | Fairchild | 123—90 |
| 3,298,333 | 1/1965 | Briggs et al | 123—90 |

AL LAWRENCE SMITH, *Primary Examiner.*